US012560959B2

(12) United States Patent
Oh

(10) Patent No.: US 12,560,959 B2
(45) Date of Patent: Feb. 24, 2026

(54) HALO DISPLAY WITH SUPER DYNAMIC SOUND

(71) Applicant: Dell Products L.P., Round Rock, TX (US)

(72) Inventor: Guentaek Oh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 18/177,403

(22) Filed: Mar. 2, 2023

(65) Prior Publication Data

US 2024/0295899 A1     Sep. 5, 2024

(51) Int. Cl.
*G06F 3/16* (2006.01)
*G06F 1/16* (2006.01)

(52) U.S. Cl.
CPC .... *G06F 1/1605* (2013.01); *G06F 2200/1612* (2013.01)

(58) Field of Classification Search
CPC .......... G06F 1/1605; G06F 2200/1612; G06F 1/1688
See application file for complete search history.

(56) References Cited

U.S. PATENT DOCUMENTS

| 2017/0148393 A1 | 5/2017 | Peana | |
| 2020/0154214 A1* | 5/2020 | Jang | H04R 1/028 |
| 2021/0041085 A1* | 2/2021 | Oh | F21V 7/0008 |
| 2021/0360097 A1* | 11/2021 | Sun | G06F 1/1637 |
| 2021/0400396 A1* | 12/2021 | Jang | H04R 17/005 |
| 2022/0085780 A1* | 3/2022 | Aurongzeb | G06F 1/1688 |
| 2023/0071365 A1* | 3/2023 | Sasaki | A61B 7/04 |

* cited by examiner

*Primary Examiner* — Sahlu Okebato
(74) *Attorney, Agent, or Firm* — Larson Newman, LLP

(57) ABSTRACT

A display for an information handling system includes a front panel, a rear portion, a first halo, and a first exciter. The first halo is located between the front panel and the rear portion. The first halo transitions between a closed position and an open position. The first exciter component is in physical communication with the first halo. The first exciter component includes first and second electrodes, and a ceramic component in physical communication with and located between the first and second electrodes. When a voltage is applied to the first and second electrodes, the ceramic component contracts and expands. The contraction and the expansion of the ceramic component generates sound from the first exciter.

16 Claims, 7 Drawing Sheets

400

HALO DISPLAY WITH SUPER DYNAMIC SOUND

FIELD OF THE DISCLOSURE

The present disclosure generally relates to information handling systems, and more particularly relates to a halo display with super dynamic sound.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A display for an information handling system includes a front panel, a rear portion, a first halo, and a first exciter. The first halo is located between the front panel and the rear portion. The first halo may transition between a closed position and an open position. The first exciter component is in physical communication with the first halo. The first exciter component includes first and second electrodes, and a ceramic component is in physical communication with and located between the first and second electrodes. When a voltage is applied to the first and second electrodes, the ceramic component may contract and expand. The contraction and the expansion of the ceramic component may generate sound from the first exciter.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
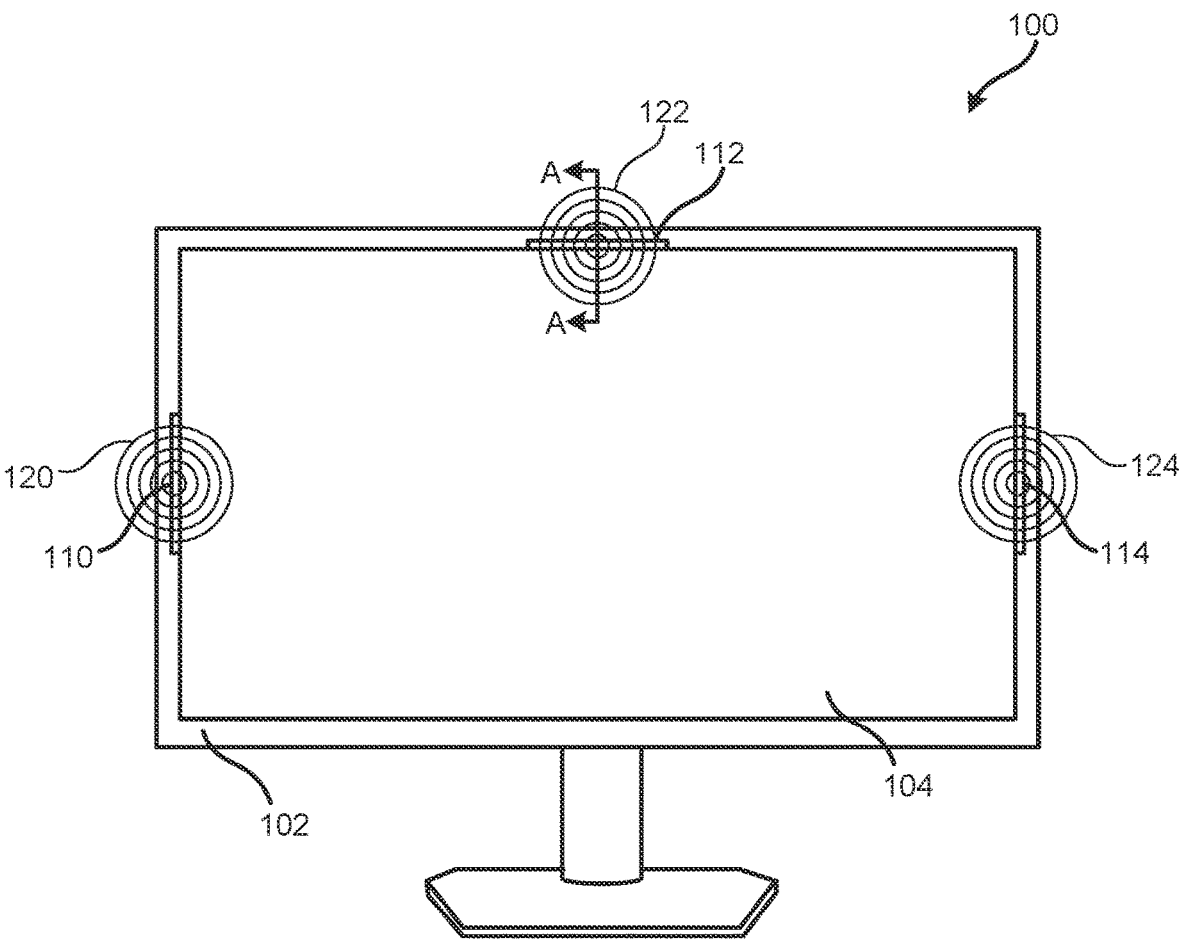
FIGS. 1-3 are diagrams of a display of an information handling system according to at least one embodiment of the present disclosure.
Figure 2:
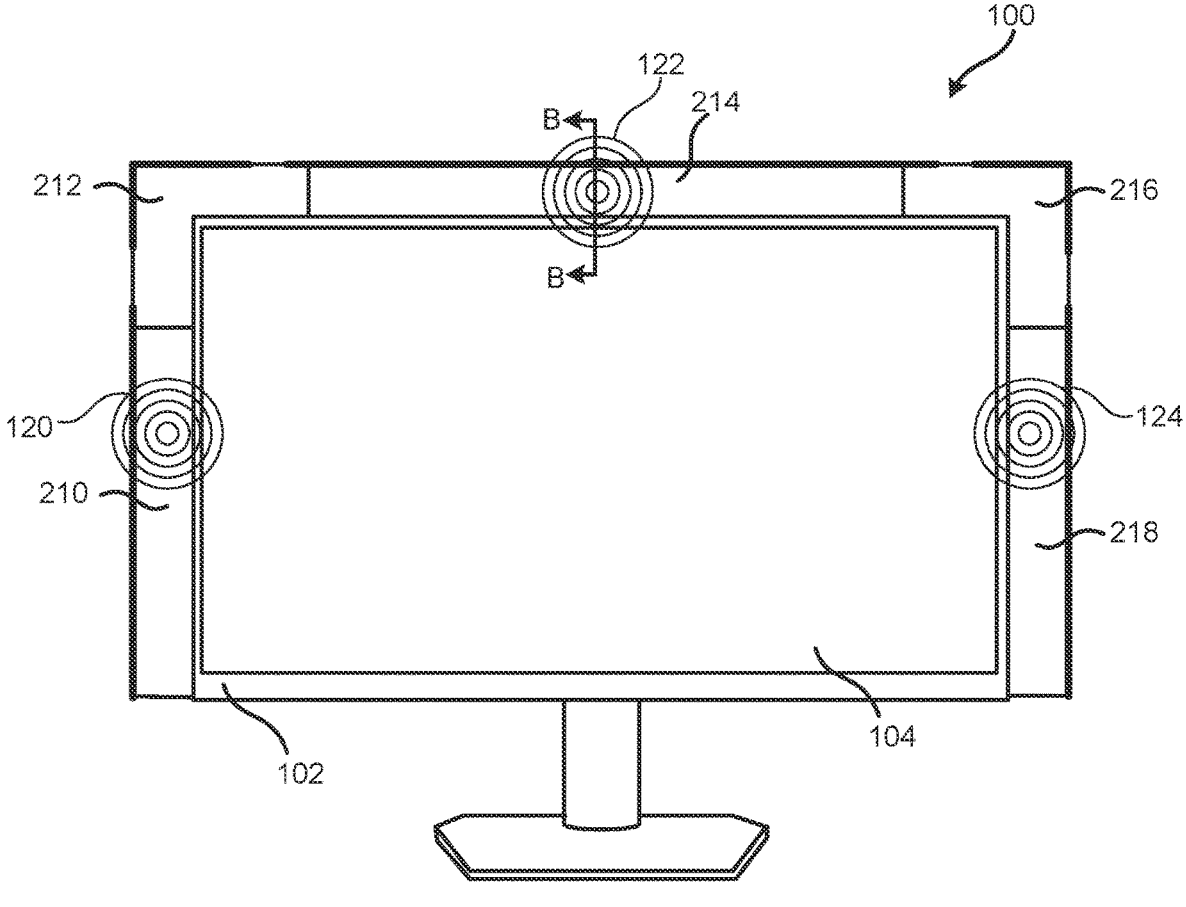
Figure 3:
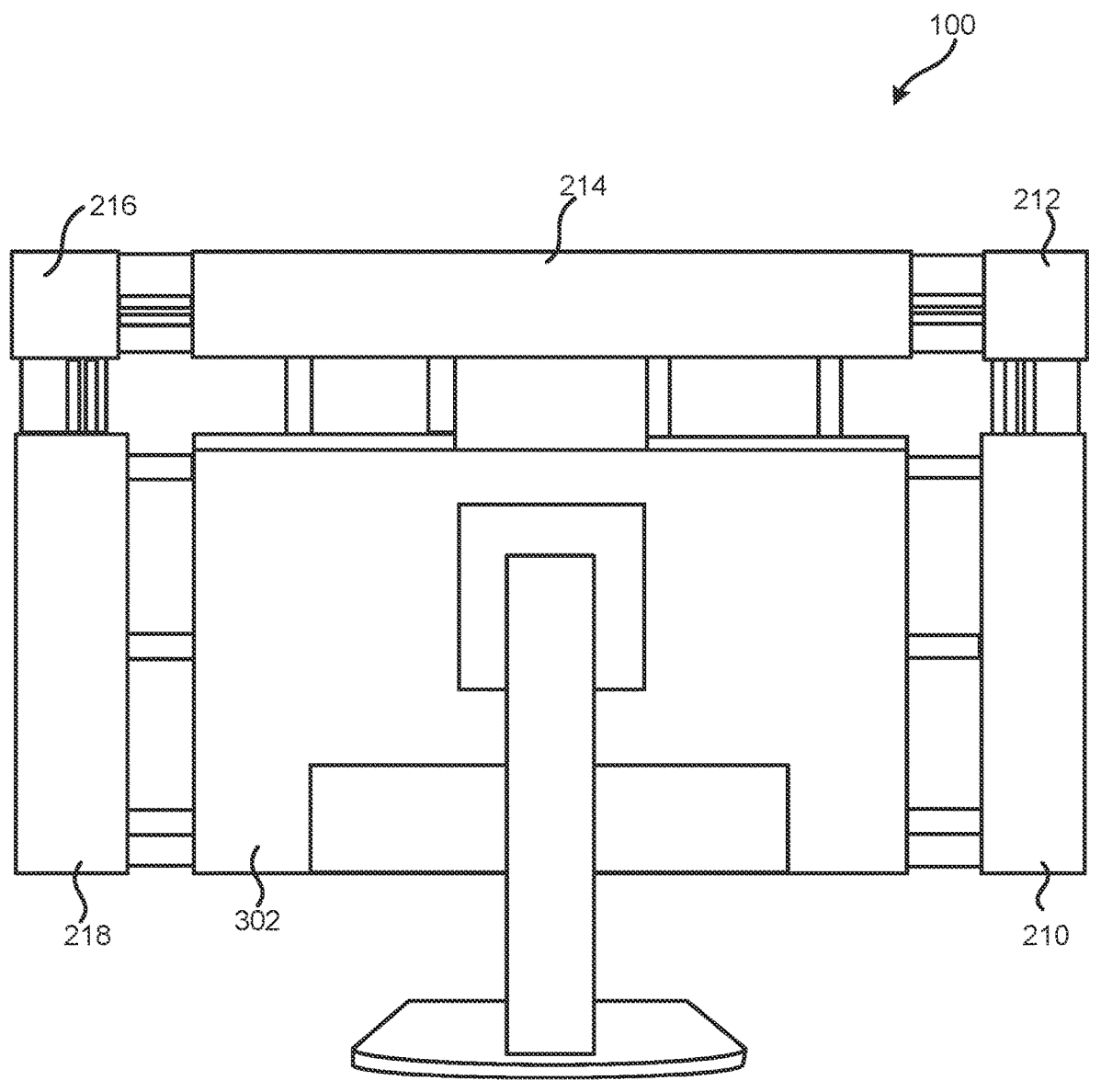

FIGS. 1-3 illustrate diagrams of a display 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Display 100 includes a front panel 102 and a display panel 104. Front panel 102 includes audio channels 110, 112, and 114. In an example, display 100 may include one or more built in speakers to provide an audio output to a user of an information handling system in communication with the display. In certain examples, a different one of the speakers may be located behind a different one of audio channels 110, 112, and 114. In an example, each of the speakers may be a front firing speaker, such that the audio generated from the speaker is provide out the front the display 100 as shown in FIGS. 1 and 2. For example, a speaker behind audio channel 110 may provide sound waves 120 through the audio channel and out the front of display 100. Similarly, a speaker behind audio channel 112 may provide sound waves 122 through the audio channel and out the front of display 100. Additionally, a speaker behind audio channel 114 may provide sound waves 124 through the audio channel and out the front of display 100. In previous information handling systems, speakers in a display may be down firing speakers such that sound waves from the speakers are provide downward from bottom of the display.

Figure 7:
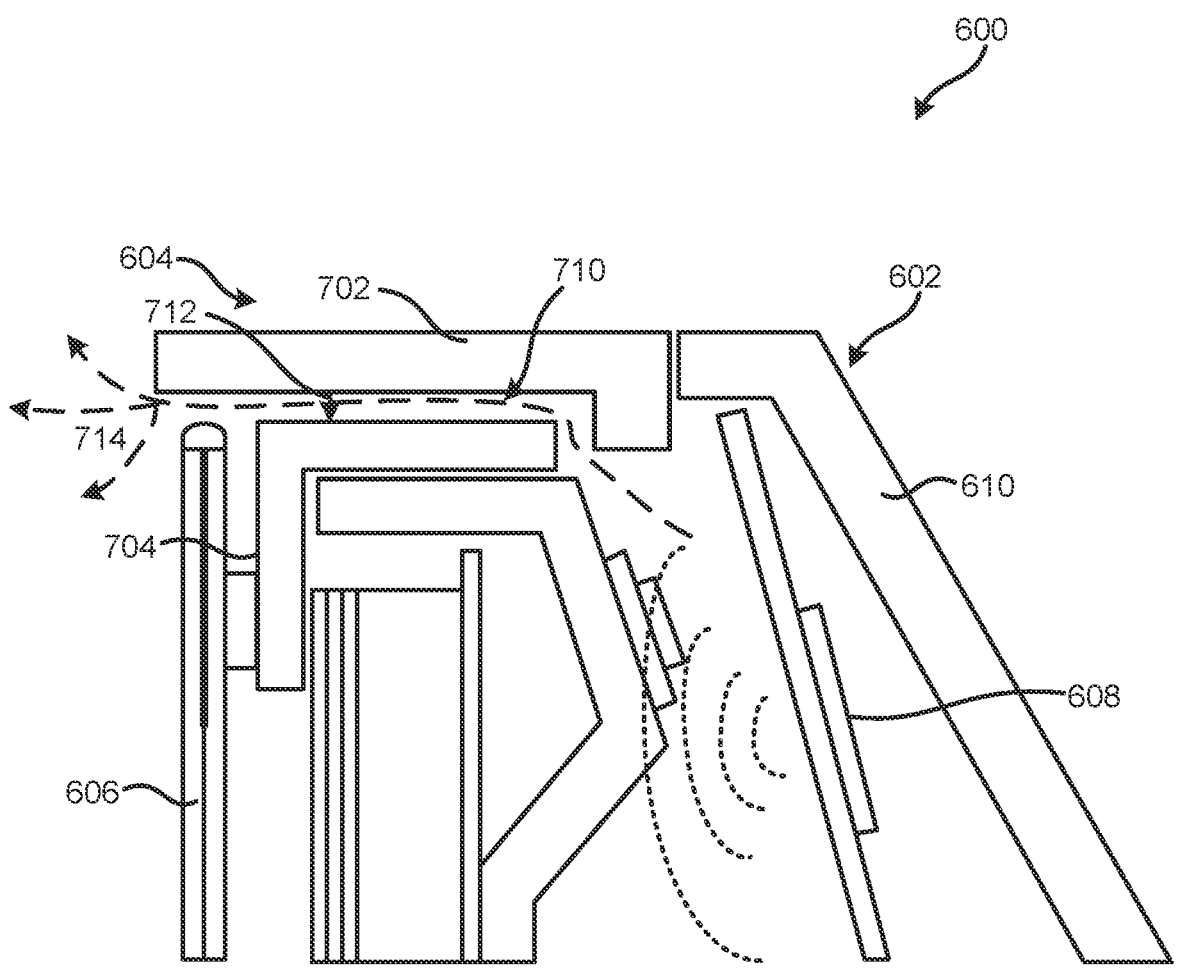
FIG. 7 is a cross-sectional view of a portion of a display with a halo portion in a closed position according to at least one embodiment of the present disclosure.
Figure 8:
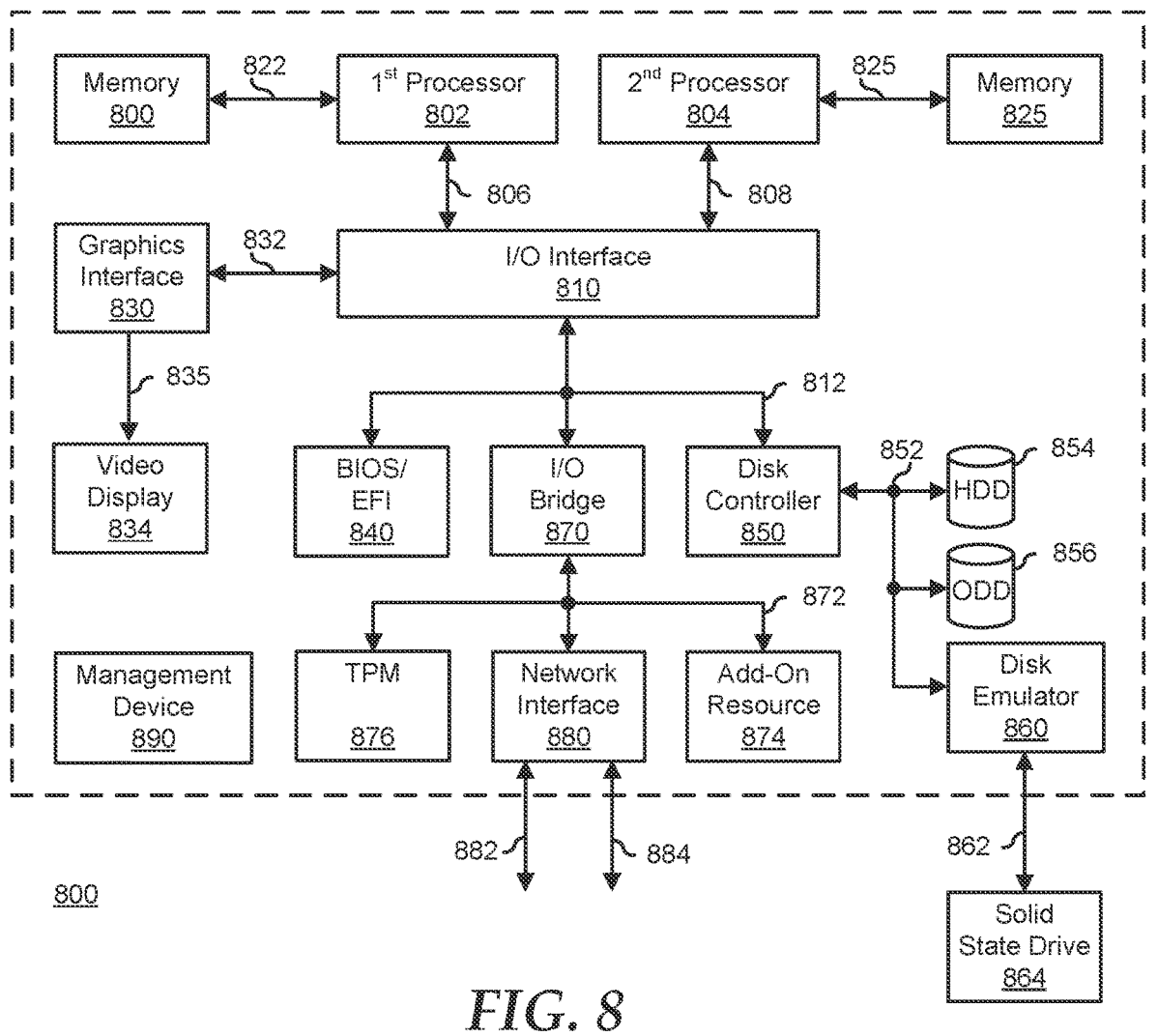
FIG. 8 is a block diagram of a general information handling system according to an embodiment of the present disclosure.

In another example, display 100 may be an 'all-in-one' system, such that the display may include the components to display images, and the components to perform operations of an information handling system, such as information handling system 800 of FIG. 8. In an example, display 100 may include additional components without varying from the scope of this disclosure. A portion of display 100 taken along line A-A will be described with respect to FIG. 7 below.

Referring now to FIG. 2, display 100 further includes halo portions 210, 212, 214, 216, and 218. Halo portions 210, 212, 214, 216, and 218 are located behind front panel 102, and each of the halo portions may slide between a closed position and an open position as will be described herein. In certain examples, each of halo portions 210, 212, 214, 216, and 218 may be any other type of baffle that captures and redirects an output of bias lighting. Using the described halo portions 210, 212, 214, 216, and 218 provides a predictable medium by which bias lighting may be provided and for which bias lighting for a particular type of display can be specially configured. Each halo portion 210, 212, 214, 216, and 218 is illustrated in the open position.

In an example, a different speaker may be located behind each of halo portions 210, 214, and 218 and each speak may be a front firing speaker. In certain examples, the speaker behind halo portion 210 may align with audio channel 110 of FIG. 1 when the halo portions are in the closed position. Similarly, the speaker behind halo portion 214 may align with audio channel 112 of FIG. 1 when the halo portions are in the closed position. Also, the speaker behind halo portion 218 may align with audio channel 114 of FIG. 1 when the halo portions are in the closed position.

In certain examples, the speaker behind halo portion 210 may provide sound waves 120 out the front of display 100. Similarly, the speaker behind halo portion 214 may provide sound waves 122 out the front of display 100. Additionally, the speaker behind halo portion 218 may provide sound waves 124 out the front of display 100. A portion of display 100 taken along line B-B will be described with respect to FIG. 6 below.

Referring now to FIG. 3, display 100 further includes a back panel 302. In an example, each of halo portions 210, 212, 214, 216, and 218 include a back surface that is part of back panel 302. For example, when halo portions 210, 212, 214, 216, and 218 are in the closed position, the back surfaces of each of the halo portions align with back panel 302 to form a substantially seamless surface to create the back panel.

Figure 4:
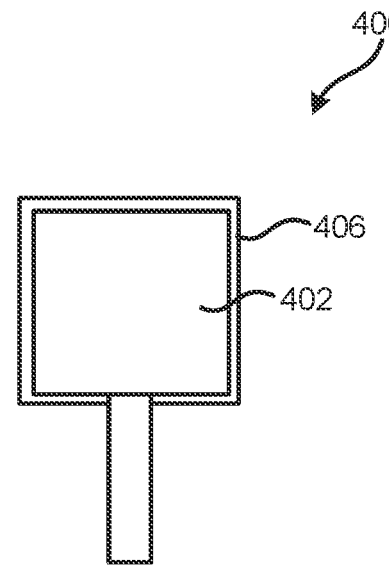
FIGS. 4-5 are diagrams of an exciter component for a display according to at least one embodiment of the present disclosure.
Figure 5:
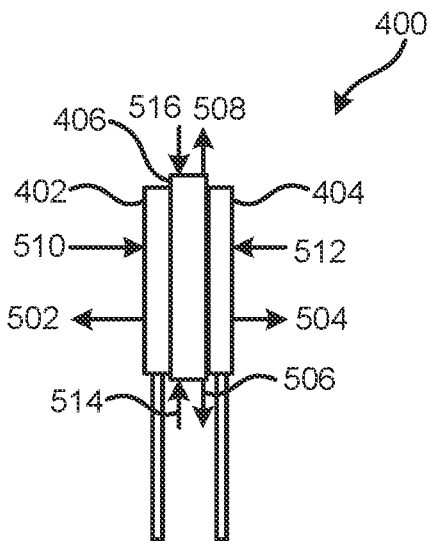

FIGS. 4-5 illustrate an exciter component 400 according to at least one embodiment of the present disclosure. Exciter component 400 includes electrodes 402 and 404, and a ceramic component 406. Electrode 402 may be in physical communication with a first surface of ceramic component 406 and electrode 404 may be in physical communication with a second surface of the ceramic component. As shown in FIG. 5, electrodes 402 and 404 are on opposite surfaces of ceramic component 406.

During operation, electrode 402 may receive a voltage having a first polarity and electrode 404 may receive a voltage having an opposite polarity of the voltage applied to electrode 404. Based on the polarities of the voltages applied to electrodes 402 and 404, exciter component 400 may contract and expand. For example, when a positive voltage is applied to electrode 402 and a negative voltage is applied to electrode 404, exciter component 400 may expand in the directions of arrows 502 and 504. In an example, the expansion of exciter component 400 in the direction of arrows 502 and 504 may create a compressive force on ceramic component 406 as indicated by arrows 506 and 508. The compressive force in the direction of arrows 506 and 508 may cause exciter component 400 to bend toward electrode 402.

In certain examples, when a negative voltage is applied to electrode 402 and a positive voltage is applied to electrode 404, exciter component 400 may contract in the direction of arrows 510 and 512. In an example, the compression of exciter component 400 in the direction of arrows 510 and 512 may create a tensile stress on ceramic component 406 as indicated by arrows 514 and 516. The tensile stress in the direction of arrows 514 and 516 may cause exciter component 400 to bend toward electrode 404. In certain examples, the bending of exciter component 400 back and forth from the direction of electrode 402 to the direction of electrode 404 may change the direction of air flow, which in turn may generate sound.

Figure 6:
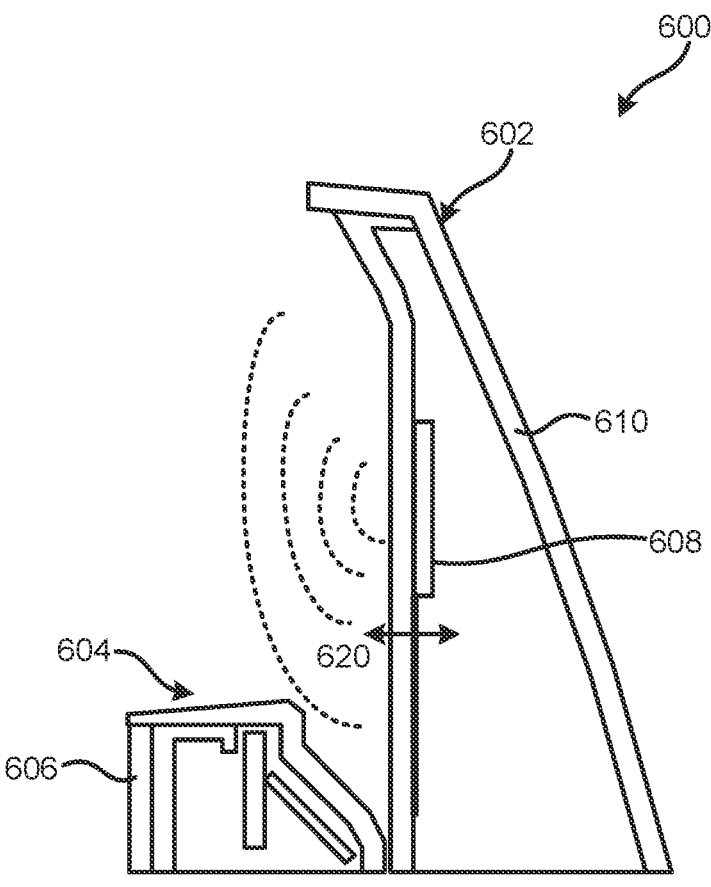
FIG. 6 is a cross-sectional view of a portion of a display with a halo portion in an open position according to at least one embodiment of the present disclosure.

FIGS. 6 and 7 illustrate a cross section of a portion 600 of a display, such as display 100 of FIG. 1, including a halo portion 602, a front panel 604, a display panel 606, and an exciter component 608 according to at least one embodiment of the present disclosure. Halo portion 602 may be substantially similar to halo portion 214 of FIG. 2, front panel 604 may be substantially similar to front panel 102 of FIG. 1, display panel 606 may be substantially similar to display panel 104 of FIG. 1, and exciter component 608 may be substantially similar to exciter component 400 of FIGS. 4 and 5. Halo portion 602 includes a back surface 610 and a reflector plate 612.

In an example, exciter component 608 may be physically attached to reflector plate 612 of halo portion 602. For example, exciter component 608 may be adhesively attached to reflector plate 612. The attachment of exciter component 608 to reflector plate 612 may result in the reflector plate being a diaphragm for the exciter component, such that the reflector plate may create an enhanced sound performance within the display. When halo portion 602 is in an open position, as shown in FIG. 6, exciter component 608 may be positioned beyond front panel 604 and display panel 606.

In an example, as different voltages are applied to the electrodes of exciter component 608, the exciter component may bend back and forth as indicated by bidirectional arrow 620. In certain examples, the bending of exciter component 608 may cause reflector plate 612 to bend the same directions as the exciter component and generate sound from the display. In an example, the combination of exciter component 608 and the separate diaphragm reflector plate 612, may increase multi-channel sound within the display and prevent distortion/interference from each of the exciter components. When halo portion 602 is beyond front panel 604 and display panel 606, the sound from exciter component 608 and reflector plate 612 may be provided to an individual associated with an information handling system without interference from the front panel and the display panel.

Referring now to FIG. 7, front panel 604 includes a top surface 702 and a display panel mounting component 704. At a particular location of front panel 604, top surface 702 may be located a particular distance 710 from display panel mounting component 704. Distance 710 may create an audio channel 712 from within the display to a front portion of the display. In an example, audio channel 712 may be substantially similar to audio channels 110, 112, and 114 of FIG. 1.

When halo portion 602 is in a closed position, as shown in FIG. 7, the sound from exciter component 608 and reflector plate 612 may be provided within the display. In previous displays, based on the sound being within the display, the different components of the display may interfere with the sound being provided to the user. In an example, exciter component 608 may be positioned behind audio channel 710 such that the sound may travel through the audio channel have distance 712. In this example, audio channel 710 may enable the sound produced by exciter component 608 and reflector plate 612 to be provided, as illustrated by arrow 714, to the user of an information handling system and the display.

FIG. 8 shows a generalized embodiment of an information handling system 800 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system.

The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832 and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 3394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812 or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800.

Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A display for an information handling system, the display comprising:

a first halo to transition between a closed position and an open position in a first direction, the first halo includes a reflector plate that is facing a front panel of the display; and a first exciter component in physical communication with a back surface of the reflector plate, the first exciter component including:

first and second electrodes; and a ceramic component in physical communication with and located between the first and second electrodes, wherein a voltage applied to the first and second electrodes causes contraction and expansion of the ceramic component and the contraction and the expansion generates sound from the first exciter, wherein the reflector plate is a diaphragm for the first exciter and based movement of the reflector plate from the contraction and the expansion of the first exciter, the first halo generates sound, wherein the movement of the first halo is caused based on the first exciter being securely attached to the back surface of the reflector plate, wherein the movement of the first halo is toward and away from a display panel of the display in a second direction, wherein the first direction and the second direction are perpendicular.

2. The display of claim 1, wherein the front panel includes:

a top surface; and a display panel mounting component, wherein a first portion of the top surface is a first predetermined distance from the display panel mounting component, wherein the sound generated by the first exciter travels through the first predetermined distance from the top surface and the display panel mounting component.

3. The display of claim 2, wherein a second portion of the top surface is a second predetermined distance from the display panel mounting component, wherein the sound generated by the first exciter does not travel through the second predetermined distance from the top surface and the display panel mounting component.

4. The display of claim 3, wherein the sound generated by the first exciter travels through the first predetermined distance when the first halo is in the closed position.

5. The display of claim 3, wherein the second predetermined distance is less than the first predetermined distance.

6. The display of claim 1, wherein the first exciter is securely attached to the first halo.

7. A display for an information handling system, the display comprising:

a front panel;

a rear portion;

a halo located between the front panel and the rear portion, the halo to transition between a closed position and an open position in a first direction, the halo includes a reflector plate that is facing the front panel of the display; and an exciter component in physical communication with a back surface of the reflector plate, the exciter component including:

first and second electrodes; and a ceramic component in physical communication with and located between the first and second electrodes, wherein a voltage applied to the first and second electrodes causes contraction and expansion of the ceramic component and the contraction and the expansion generates sound from the exciter, wherein the reflector plate is a diaphragm for the exciter and based movement of the reflector plate from the contraction and the expansion of the exciter, the halo generates sound, wherein the movement of the halo is caused based on the exciter being securely attached to the back surface of the reflector plate, wherein the movement of the halo is toward and away from a display panel of the display in a second direction, wherein the first direction and the second direction are perpendicular.

8. The display of claim 7, wherein the front panel includes:

a top surface; and a display panel mounting component, wherein a first portion of the top surface is a first predetermined distance from the display panel mounting component, wherein the sound generated by the exciter travels through the first predetermined distance from the top surface and the display panel mounting component.

9. The display of claim 8, wherein a second portion of the top surface is a second predetermined distance from the display panel mounting component, wherein the sound generated by the exciter does not travel through the second predetermined distance from the top surface and the display panel mounting component.

10. The display of claim 9, wherein the sound generated by the exciter travels through the first predetermined distance when the halo is in the closed position.

11. The display of claim 10, wherein the second predetermined distance is less than the first predetermined distance.

12. The display of claim 7, wherein the exciter is securely attached to the halo.

13. A display for an information handling system, the display comprising:

first and second halos, wherein first halo to transition between a closed position and an open position in a first direction, the first halo includes a reflector plate that is facing a front panel of the display;

a first exciter component securely mounted to a back surface of the reflector plate, wherein the reflector plate is a diaphragm for a first sound generated by the first exciter component, wherein based movement of the first halo from a contraction and an expansion of the first exciter, the first halo generates sound, wherein the movement of the first halo is caused based on the first exciter being securely attached to the first halo, wherein the movement of the first halo is toward and away from a display panel of the display in a second direction, wherein the first direction and the second direction are perpendicular;

a second exciter component securely mounted to the second halo, wherein the second halo is a diaphragm for a second sound generated by the second exciter component; and the front panel including:

a top surface; and a display panel mounting component, wherein a first portion of the top surface is a first predetermined distance from the display panel mounting component, wherein the first sound generated by the first exciter travels through the first predetermined distance from the first portion of the top surface and the display panel mounting component, wherein a second portion of the top surface is the first predetermined distance from the display panel mounting component, and wherein the second sound generated by the second exciter travels through the first predetermined distance from the second portion of the top surface and the display panel mounting component.

14. The display of claim 13, wherein a third portion of the top surface is a second predetermined distance from the display panel mounting component, wherein the first sound and the second sound do not travel through the second predetermined distance from the third portion the top surface and the display panel mounting component.

15. The display of claim 14, wherein the second predetermined distance is less than the first predetermined distance.

16. The display of claim 13, wherein the first sound travels through between the first portion of the top surface and the display panel mounting component when the first halo is in a closed position, and the second sound travels through between the second portion of the top surface and the display panel mounting component when the second halo is in the closed position.

* * * * *